(12) United States Patent  
Button et al.

(10) Patent No.: US 9,559,529 B1
(45) Date of Patent: Jan. 31, 2017

(54) MODULAR BATTERY CONTROLLER

(75) Inventors: Robert M Button, Westlake, OH (US); Marcelo C Gonzalez, Macedonia, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 815 days.

(21) Appl. No.: 13/193,160

(22) Filed: Jul. 28, 2011

Related U.S. Application Data

(60) Provisional application No. 61/369,211, filed on Jul. 30, 2011.

(51) Int. Cl.
*H02J 7/00* (2006.01)

(52) U.S. Cl.
CPC ................... *H02J 7/0016* (2013.01)

(58) Field of Classification Search
CPC ............ Y02E 60/12; H02J 7/0016; H02J 7/20
USPC ......... 320/116, 119, 122, 123; 710/105, 110, 710/111, 113, 119; 713/340
See application file for complete search history.

(56) References Cited

U.S. PATENT DOCUMENTS

| | | | |
|---|---|---|---|
| 5,498,950 A | 3/1996 | Ouwerkerk | |
| 5,656,915 A | 8/1997 | Eaves | |
| 5,666,040 A * | 9/1997 | Bourbeau | H01M 2/348 320/118 |
| 5,701,068 A | 12/1997 | Baer et al. | |
| 5,739,669 A | 4/1998 | Brulhardt et al. | |
| 5,764,027 A | 6/1998 | Harvey | |
| 5,850,351 A | 12/1998 | Lotfy et al. | |
| 5,880,575 A | 3/1999 | Itou et al. | |
| 5,920,179 A | 7/1999 | Pedicini | |
| 5,998,969 A | 12/1999 | Tsuji et al. | |
| 6,097,174 A | 8/2000 | Yang et al. | |
| 6,157,167 A | 12/2000 | Schwartz et al. | |
| 6,239,579 B1 | 5/2001 | Dunn et al. | |
| 6,291,972 B1 * | 9/2001 | Zhang | 320/118 |
| 6,599,655 B2 | 7/2003 | Johnson et al. | |
| 6,882,129 B2 | 4/2005 | Boskovitch et al. | |
| 7,245,108 B2 | 7/2007 | Chertok et al. | |
| 7,298,114 B2 | 11/2007 | Yang | |
| 7,304,453 B2 | 12/2007 | Eaves | |
| 7,471,066 B2 | 12/2008 | Ambrosio et al. | |
| 7,728,552 B2 | 6/2010 | Burns | |
| 8,198,862 B2 * | 6/2012 | Zhang et al. | 320/118 |
| 8,697,267 B2 * | 4/2014 | Colello et al. | 429/61 |
| 2004/0036446 A1 * | 2/2004 | Iwashima | 320/116 |
| 2005/0242775 A1 * | 11/2005 | Miyazaki | H02J 7/0026 320/116 |
| 2007/0268000 A1 * | 11/2007 | Kobayashi et al. | 320/118 |
| 2009/0096420 A1 * | 4/2009 | Lupu | H02J 7/0016 320/122 |
| 2010/0033128 A1 * | 2/2010 | Densham | H02J 7/0016 320/116 |
| 2010/0052692 A1 * | 3/2010 | Yano et al. | 324/427 |

(Continued)

*Primary Examiner* — Richard Isla Rodas
*Assistant Examiner* — Michael Dibenedetto
(74) *Attorney, Agent, or Firm* — Robert H. Earp, III

(57) ABSTRACT

Some embodiments of the present invention describe a battery including a plurality of master-less controllers. Each controller is operatively connected to a corresponding cell in a string of cells, and each controller is configured to bypass a fraction of current around the corresponding cell when the corresponding cell has a greater charge than one or more other cells in the string of cells.

16 Claims, 7 Drawing Sheets

(56) References Cited

U.S. PATENT DOCUMENTS

| | | | |
|---|---|---|---|
| 2010/0097034 A1* | 4/2010 | Shu et al. | 320/126 |
| 2011/0106992 A1* | 5/2011 | Lee | G06F 1/3203 710/110 |
| 2012/0194133 A1* | 8/2012 | Posamentier | H02J 7/0018 320/116 |
| 2013/0019118 A1* | 1/2013 | Flippin | H01M 10/425 713/340 |

* cited by examiner

MODULAR BATTERY CONTROLLER

CROSS-REFERENCE TO RELATED APPLICATION

This application claims the benefit of U.S. Provisional Patent Application No. 61/369,211, filed on Jul. 30, 2010. The subject matter of the earlier filed application is hereby incorporated by reference in its entirety.

ORIGIN OF THE INVENTION

The invention described herein was made by an employee of the United States Government and may be manufactured and used by or for the Government for Government purposes without the payment of any royalties thereon or therefore.

FIELD

The present invention relates to a battery controller and, more particularly, to a modular battery controller that implements a distributed cell balancing and charge control scheme.

BACKGROUND

A battery is comprised of a series of cells. In order to manage the voltage of the cells, a single controller is utilized. For example, the current state-of-the-art in digital charge control of batteries rests on the use of a single controller for multiple cells stacked in series. However, this approach may cause the battery to be susceptible to a single fault failure. In other words, this is a failure of the single charge controller (e.g., a Digital Signal Processor (DSP) or a Microcontroller). As a result, the cells in the battery may be more susceptible to failure due to the failure of the single charge controller.

SUMMARY

Certain embodiments of the present invention may provide solutions to the problems and needs in the art that have not yet been fully identified, appreciated, or solved by current battery cell controllers.

In accordance with an embodiment of the present invention, an apparatus is provided. The apparatus includes a plurality of master-less controllers. Each controller is operatively connected to a corresponding cell in a string of cells, and each controller is configured to bypass a fraction of current around the corresponding cell when the corresponding cell has a greater charge than one or more other cells in the string of cells.

In accordance with another embodiment of the present invention, an apparatus is provided. The apparatus includes a string of cells and a plurality of master-less controllers. Each controller is connected to an assigned cell in the string of cells and is connected to one neighboring controller. Furthermore, each controller is configured to bypass a fraction of current around the assigned cell when the assigned cell has a higher voltage compared to other cells in the string of cells In accordance with yet another embodiment of the present invention, a method is provided. The method includes assigning a master-less controller to a cell in the string of cells, and bypassing a fraction of current around an assigned cell when the assigned cell has a higher voltage compared to other cells in a string of cells.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

It will be readily understood that the components of the present invention, as generally described and illustrated in the figures herein, may be arranged and designed in a wide variety of different configurations. Thus, the following detailed description of the embodiments of an apparatus, a system, a method, and a computer readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Embodiments of the present invention provide a modular battery charge controller or a master-less distributed digital charge controller for batteries having multiple cells stacked in a series requiring charge control. In such embodiments, each controller is assigned to a cell and, in some embodiments, one or more neighboring cells resulting in redundant sensors for critical components such as voltage, temperature, and current. The controllers in a given battery interact in a master-less fashion for the purpose of cell balancing, charge control, and state of charge estimation. As a result, the battery system is fault tolerant.

Figure 1:
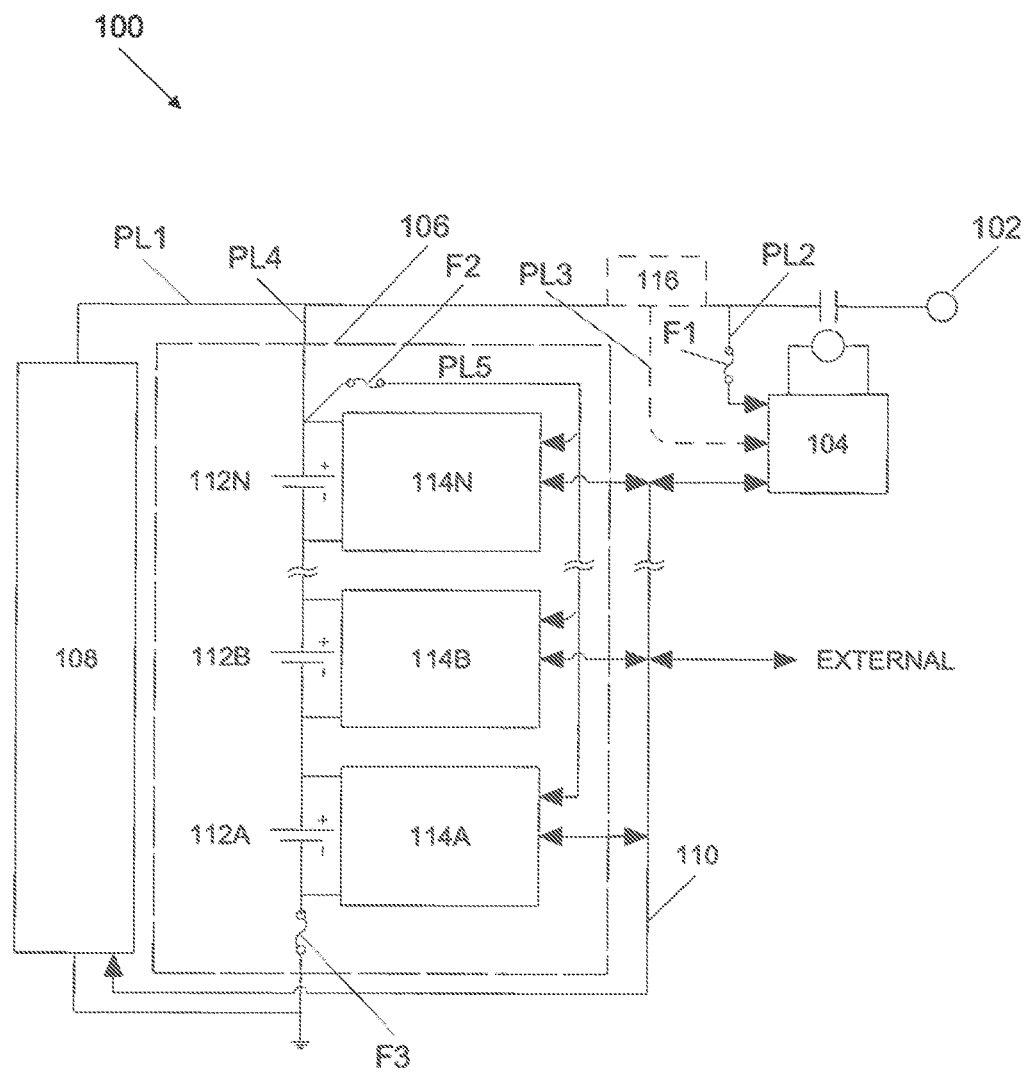
FIG. 1 illustrates a modular charge control apparatus, in accordance with an embodiment of the present invention.

FIG. 1 illustrates a modular charge control apparatus 100, in accordance with an embodiment of the present invention. Apparatus 100 includes, but is not limited to, a power source and/or load connection point 102, a relay driver 104, a string of cells 106, parallel strings 6f cells 108, and a communication bus 110. String of cells 106 can include a plurality of cells 112A to 112N and a plurality of controllers 114A to 114N. In this embodiment, cells 112A to 112N are lithium ion cells, but other embodiments may use any type of cell that would be appreciated by a person of ordinary skill in the art.

String of cells 106 can be arranged in a series to form a battery and is configured to set a voltage level of the battery. Parallel strings of cells 108 encompass the battery and are configured to set the current or power that the battery can deliver at the set voltage level. Parallel strings of cells 108 are operatively connected to communication bus 110, and each cell in parallel strings of cells 108 has a corresponding controller to maintain active balancing of the cells. Each cell in string of cells 106 is operatively connected to the corresponding controller. For example, cell 112A is connected to controller 114A, cell 112B is connected to controller 114B, and so on.

Also, each controller can be configured to communicate with the other controllers via communication bus 110. For example, controller 114A can broadcast (or communicate) data regarding cell 112A and/or data regarding controller 114A to controller 114B. In this embodiment, each controller is configured to monitor a corresponding cell and broadcast data regarding the corresponding cell. For instance, controller 114A is operatively connected to cell 112A, and is configured to monitor cell 112A and broadcast data regarding cell 112A. The data may represent the cell voltage, the cell temperature, the current in string of cells 106, and/or the bypass current of the cell, as well as any other data that would be appreciated by a person of ordinary skill in the art. Because cells 112A to 112N are connected in series, when the string is charged and/or discharged, each cell 112A to 112N in the string is configured to receive the same amount of current, unless the cell is bypassed.

Each controller can also be configured to maintain balance of the voltages between all the cells in string of cells 106 during charging and, if desired, discharging in order to maintain a charge balance on cells 112A to 112N. For example, if cell 112A has a high voltage compared to one or more cells in string of cells 106, then controller 114A is configured to bypass a fraction of the current around cell 112A.

In order to correctly balance cells 112A to 112N, each controller 114A to 114N is configured to receive data from the other controllers, which gather the data regarding the cell voltage of a corresponding cell. For example, controller 114A is configured to receive data from controllers 114B to 114N regarding the cell voltages of cells 112B to 112N. Based on the received data, controller 114A can independently determine whether the cell 112A needs to be balanced. If cell 112A needs to be balanced, then a fraction of the current is bypassed around cell 112A. See FIG. 4 for an explanation of cell balancing.

Each controller 114A to 114N is also capable of determining whether the battery is exceeding a safety condition and, if so, then any of the controllers can be configured to communicate to relay driver 104 in order to turn off or stop the battery from charge and discharge. In this embodiment, controller 114A is configured to determine whether the battery is exceeding a safety condition. Each controller 114A to 114N can also be configured to monitor the temperature of each cell in string of cells 106.

In FIG. 1, controller 114A, or any controller 114B to 114N based on the configuration of apparatus 100, can also receive the battery voltage from power line PL5. A fuse F2 is connected to power line PL5 where battery voltage is transmitted. Fuse F2 is configured to protect against short-circuit faults and prevent the wire or power line PL5 from burning. Fuses F3 and F1 are configured to function in a similar manner.

By receiving the battery voltage via power line PL5, controller 114A, for example, can detect whether the battery voltage is exceeding a threshold level and, if exceeding the threshold level, controller 114A can command relay driver 104 to turn off or shut down the battery.

In this embodiment, relay driver 104 can be a microcontroller with a communication bus and can be configured to monitor the voltage of the battery via power line PL2 and the current of the battery via power line PL3. In particular, current sensor 116 is configured to measure the current of the battery and transmit the measurement to relay driver 104. As a result, if the battery voltage or charge current is too low, too high and/or is unsafe, then relay driver 104 can disconnect power from the battery or strings of cells 106 and 108. Relay driver 104 can also disconnect power from the battery, when commanded by any of charge controllers 114A to 114N, if the temperature of any of cells 112A to 112N or the battery exceeds a threshold level. In one or more embodiment, relay driver 104 is configured to receive periodic messages from each controller 114A to 114N in order to verify whether each controller 114A to 114N is operable. It should be appreciated that if one or more controllers 114A to 114N fail to broadcast the periodic message, then relay driver 104 is configured to safely disconnect the battery from the system and/or notify the system operator. In an alternative embodiment, controllers 114A to 114N are also configured to notify relay driver 104 when one or more controllers are inoperable.

It should also be appreciated that relay driver 104 receives power from power line PL2 via fuse F1. In some embodiments, relay driver 104 can be configured to broadcast via communication bus 110 the total battery voltage to the charge controllers to infer the voltage of a cell for the purpose of cell balancing and monitoring if the cell's corresponding controller fails.

It should be appreciated that communication bus 110 is an addressable bus (serial communication bus) in this embodiment that allows each controller to have a controller identification (ID). When controller 114A, for example, is broadcasting data to controllers 114B to 114N, the ID of controller 114A is also broadcasted, along with the data, to controllers 114B to 114N, via communication bus 110. This allows other controllers to determine whether a certain controller broadcasted data. For example, if controller 114A does not receive data from controller 114B, controller 114A can determine that controller 114B did not broadcast data based on the missing ID of controller 114B. Controller 114A can also determine the voltage of cell 112B by subtracting the cell voltages of the cells that were broadcasted from the total battery voltage, i.e., $V_{cc} = V_{battery} - \Sigma V_{cell}$.

In this embodiment, communication bus 110 can be a controller area network (CAN) bus. However, a person of ordinary skill in the art would readily appreciate that communication bus 110 can be Ethernet, Spacewire, a System Management Bus, Firewire, a Universal Serial Bus, a Serial Peripheral Interface, or a wireless communication link such as Bluetooth, Zigbee, Insteon, and Wi-Fi, or may be any type of communication bus based on the configuration of apparatus 100. Because communication bus 110 is a CAN bus, communication bus 110 can automatically detect the collision of data broadcast from controllers 114A to 114N and prevent such collisions from occurring.

Furthermore, communication bus 110 is operatively connected to an external data acquisition system, external controller, or external spacecraft controller (not shown). For example, this configuration allows data gathered by controllers 114A to 114N and relay driver 104 to be broadcast to the external system in order to display data to an operator of the vehicle (e.g., spacecraft, aircraft, etc.), as well as the ability to send commands to one or more controllers from the external system.

Figure 2:
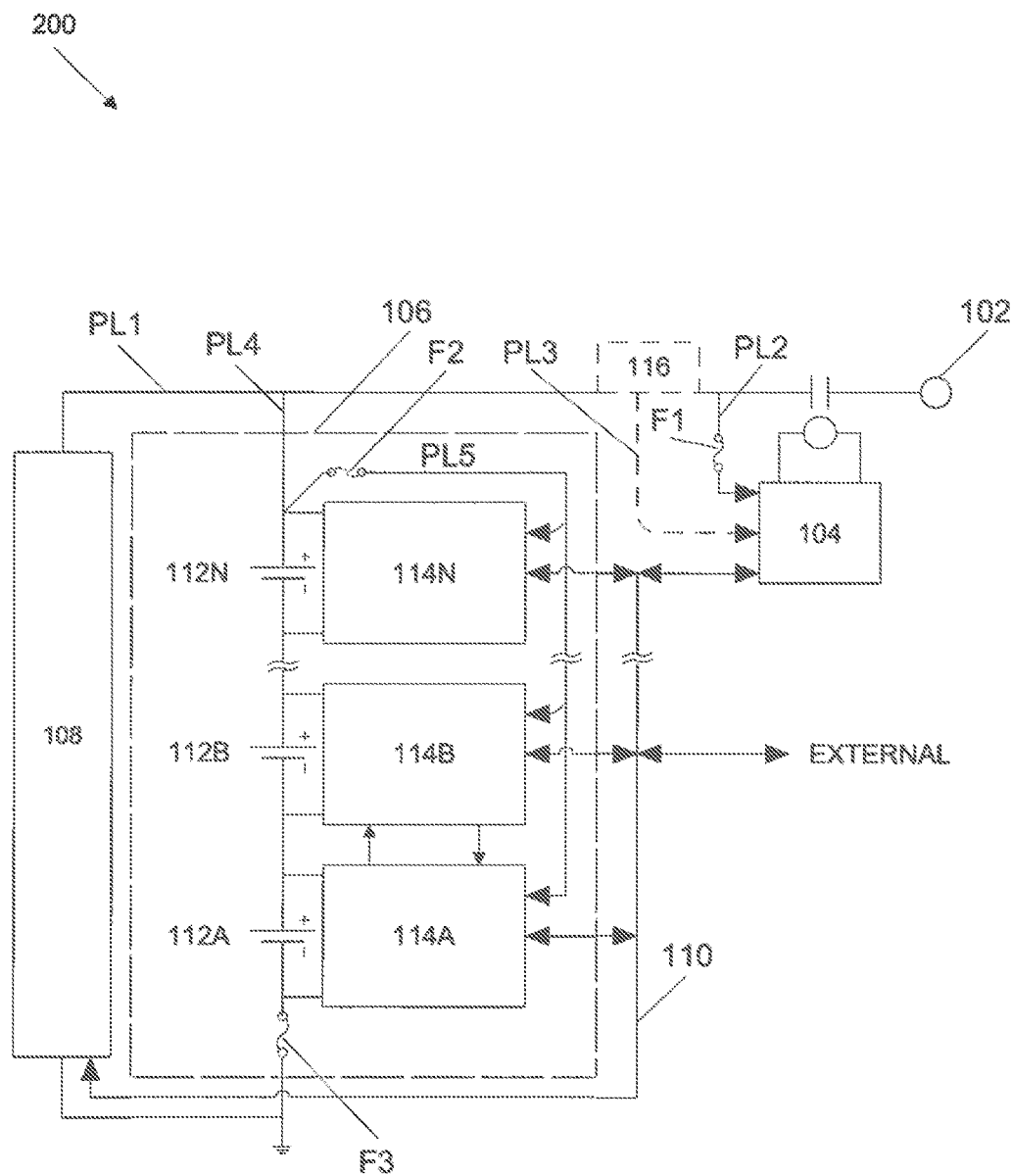
FIG. 2 illustrates a modular charge control apparatus, in accordance with an embodiment of the present invention.

FIG. 2 illustrates a modular charge control apparatus 200, in accordance with an embodiment of the present invention. Modular charge control apparatus 200 shown in FIG. 2 illustrates similar elements and/or features as modular charge control apparatus 100, which is shown in FIG. 1, except that each controller 114A to 114N in modular charge control apparatus 200 can be connected to one of the neighboring controllers. For example, controller 114B can be directly connected to controller 114A. If there are additional controllers, then the third and fourth controllers can be directly connected to each other, the fifth and sixth controllers can be directly connected to each other, and so on. However, a person of ordinary skill in the art would readily appreciate that each controller 114A to 114N can be connected to one or more controllers based on the configuration of apparatus 200.

Each controller 114A to 114N is assigned a corresponding cell 112A to 112N and is configured to broadcast or communicate data regarding the corresponding cell as well as battery voltage and current, if so configured, to other controllers. For example, controller 114A is configured to receive data regarding cells 112B to 112N from controllers 114B to 114N. This allows controller 114A to receive cell voltages of cells 112B to 112N and determine the total battery voltage.

If one of the controllers does not broadcast data, then the other controllers can determine which controller did not broadcast data. For example, if controller 114A does not receive data from controller 114B, controller 114A can determine that controller 114B did not broadcast data based on the ID of controller 114B. This configuration allows controller 114A to directly measure the voltage of cell 112B and maintain the cell voltage on cell 112B because controller 114A and controller 114B are directly connected to each other. This embodiment not only allows each controller to actively maintain balance of a corresponding cell, but also allows each controller to maintain balance of a neighboring cell or bypass the current from a neighboring cell should a neighboring controller fail.

Figure 3:
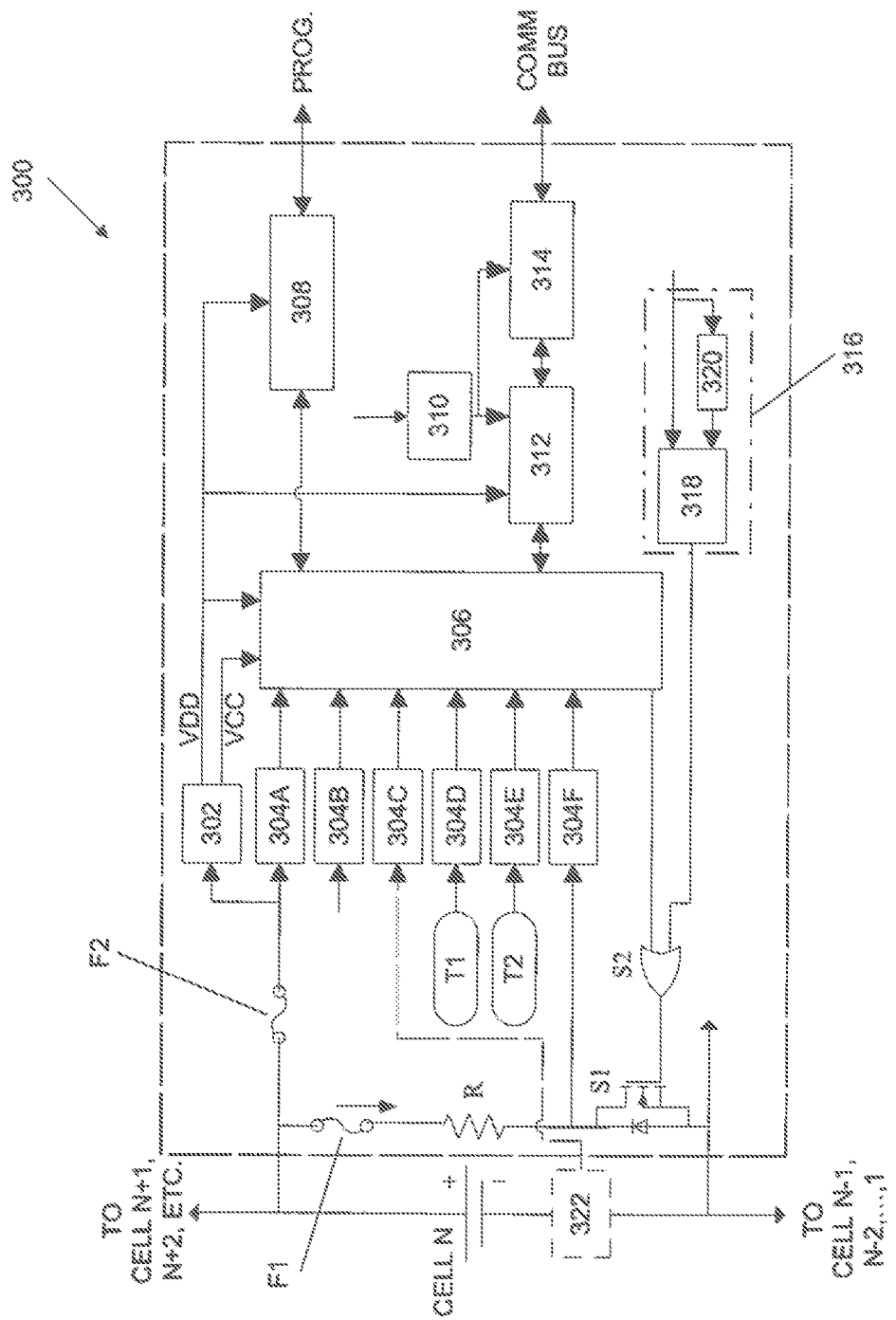
FIG. 3 illustrates a controller, in accordance with an embodiment of the present invention.

FIG. 3 illustrates a controller 300, in accordance with an embodiment of the present invention. Controller 300 includes, but is not limited to, a regulator 302, a plurality of signal conditioners 304A-F, a microcontroller 306, a program interface 308, an isolation regulator 310, an isolation unit 312, a transceiver 314, a backup controller 316 that includes a comparator 318 and a reference 320, and a current sensor 322.

Controller 300 also includes bypass circuitry that may dissipate power. The bypass circuit includes a fuse F1, a resistor R, and a switch S1. In this embodiment, switch S1 is a field effect transistor, but in other embodiments can be any switch that would be appreciated by a person of ordinary skill in the art. The value of resistor R of the bypass circuitry can be adjusted to set the maximum bypass current based upon the maximum expected voltage of the cell N. It should be appreciated that if a bipolar transistor is utilized as the switch, then the amount of bypass current can be varied.

The positive side of the cell N provides power or positive cell voltage to controller 300 and, in particular, to voltage regulator 302 and conditioner 304A. Conditioner 304A is configured to step down or step up the cell voltage, if needed, and filter any noise received from the positive cell voltage. It should be appreciated that conditioners 304B-F function in a similar fashion to conditioner 304A. Regulator 302 is configured to receive positive cell voltage to generate a fixed voltage for microcontroller 306 or any other components on controller 300.

Positive cell voltage is also provided to reference 320 and comparator 318, which make up backup controller 316. Reference 320 provides a reference voltage (or point). The reference voltage allows comparator 318 to compare the cell voltage with the reference point to determine whether to turn switch S1 on. For instance, if the cell voltage is greater than the reference voltage, then comparator 318 turns switch S1 on, via OR-ing function 82. This allows backup controller 316 to bypass current from a cell once a set voltage is reached or exceeded if microcontroller 306 fails.

Positive cell voltage is also provided to isolation regulator 310. Isolation regulator 310 provides a fixed voltage to isolation unit 312 and transceiver 314. Because each controller operates at different voltages in relation to one another, the communication bus has to be isolated from each controller. Transceiver 314 is configured to receive data from and broadcast data to the communication bus. Isolation would not be required in an embodiment that utilized wireless communication.

In order to program microcontroller 306, a program interface 308 is utilized. However, it should be appreciated that microcontroller 306 can be programmed via the communication bus. The program will dictate the conditions to perform, for example, active cell balancing, or any function that would be appreciated by a person of ordinary skill in the art.

In this embodiment, temperature sensors T1 and T2 are mounted on controller 300 and can be physically attached along with the controller to a battery cell using a thermally conductive epoxy. Temperature sensors T1 and T2 provide the temperature of cell N to microcontroller 306 via conditioners 304D and 304E, respectively. Two temperature sensors are utilized in this embodiment to ensure that the cell temperature is being monitored in the event that either temperature sensor T1 or T2 fails. In other words, temperature sensor T2 may act as a backup sensor to temperature sensor T1, and vice versa.

It should be appreciated that, in this embodiment, the voltage across the switch S1 (and/or resistor R) is received at microcontroller 306 via conditioner 304F. This allows microcontroller 306 to measure and calculate the bypass current. FIG. 3 also shows a current sensor 322 that measures the current of the string of cells and transmits the measurement to microcontroller 306 via conditioner 304C. Current sensor 322 can be a shunt, an isolated current sensor, or any current sensor that would be appreciated by a person of ordinary skill in the art.

The voltage of the battery is received by microcontroller 306 via conditioner 304B. As mentioned above, the voltage of the cell N is received by microcontroller 306 via conditioner 304A. This allows microcontroller 306 to compare the battery voltage and the summation of cell voltages to determine sensor failure or degradation, state of charge estimation, and cell balancing. Microcontroller 306 also broadcasts the battery voltage to other controllers via the communication bus. This allows the other controllers to determine sensor failure or degradation, state of charge estimation, and cell balancing.

Figure 4:
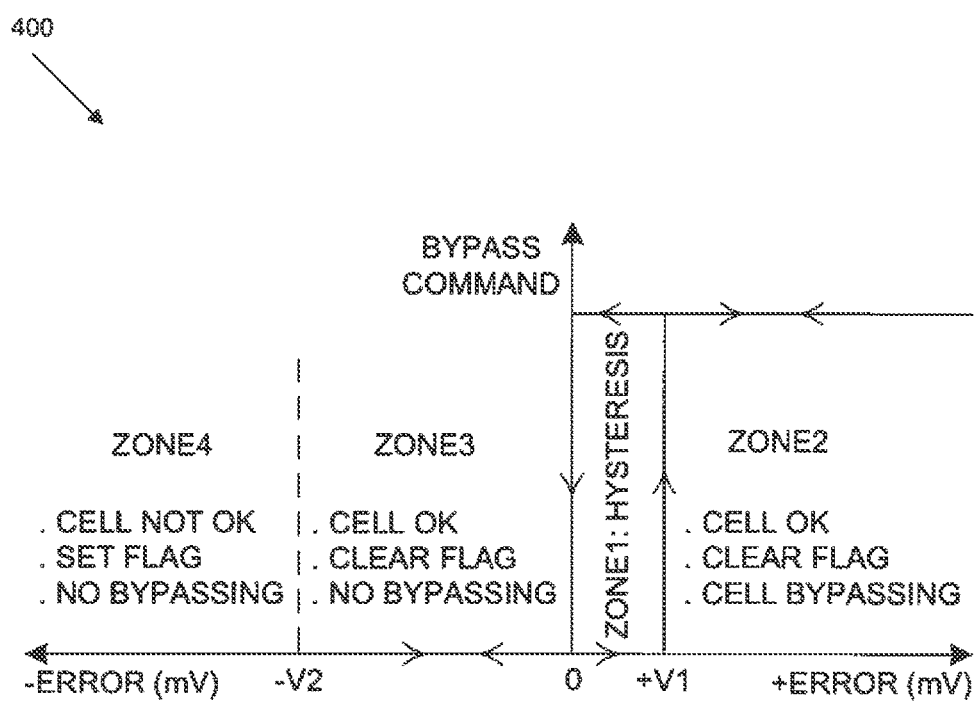
FIG. 4 illustrates cell balancing zones, in accordance with an embodiment of the present invention.

FIG. 4 illustrates cell-balancing zones 400, in accordance with an embodiment of the present invention. In this embodiment, FIG. 4 illustrates four zones: zone 1, zone 2, zone 3, and zone 4.

For instance, zone 4 illustrates when the error of a cell is less than a second voltage parameter −V2, which may be −125 mV. When the cell error is in zone 4, the controller sets a flag and does not perform bypassing because the cell voltage is less than the voltages of the other cells in the string. In zone 3, if the cell error is between the second voltage parameter −V2 and 0 volts, then the cell is determined to be ok and the flag is cleared. In this zone, the controller also does not perform bypassing because the cell voltage is less than the voltages of the other cells in the string. See FIG. 7 for a more detailed explanation.

However, zone 1, which is a hysteresis zone, shows that the cell error is between 0 and first voltage parameter +V1, which may be 20.8 mV. In this zone, the controller determines that the cell is ok, but retains the previous bypass command; that is, if the controller was previously bypassing current, then the controller continues to bypass current until the cell error is below 0 mV and, if the controller was not bypassing current, then the controller continues to not bypass current. In zone 2, when the cell error is greater than first voltage parameter +V1, the controller indicates that the cell is ok and clears the flag. The controller also performs bypassing of the current of the cell until the cell error is below 0 mV.

Figure 5:
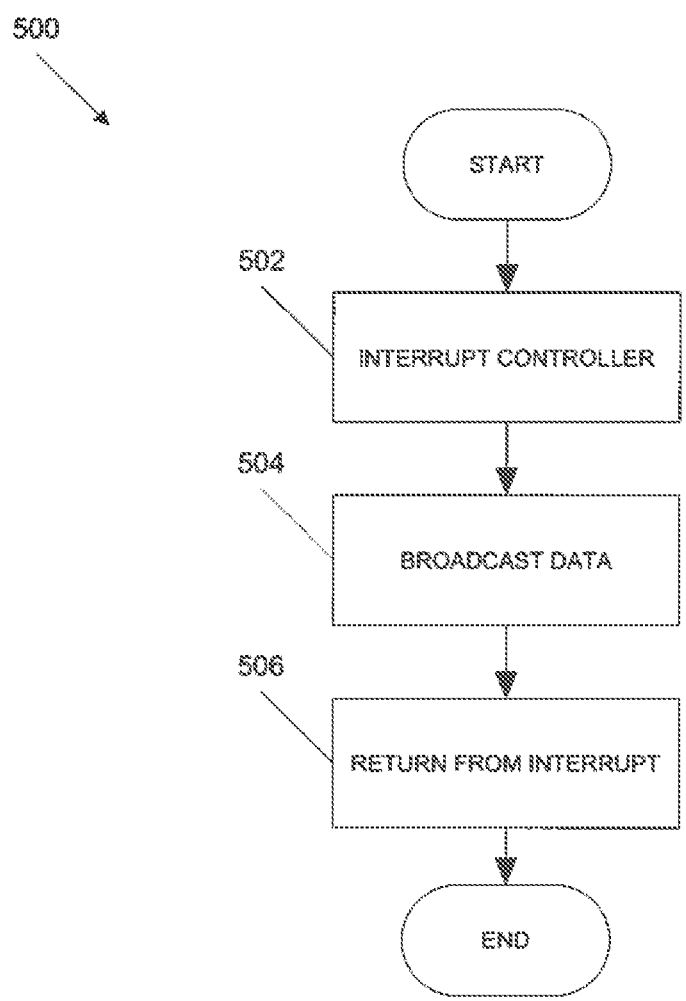
FIG. 5 illustrates a method for broadcasting cell data, in accordance with an embodiment of the present invention.

FIG. 5 illustrates a method 500 for broadcasting cell data, in accordance with an embodiment of the present invention. In this embodiment, a timer is setup for each controller to broadcast data at certain time intervals. For example, at 502, the timer can interrupt the controller every half a second for transmission of data. However, the timer intervals can be configured for any time based on the configuration of the apparatus. At 504, the controller broadcasts data to the other controllers in the apparatus via the communication bus. The data can include information regarding the cell voltage of the cell corresponding to the controller, a bypass current of the cell, and other variables such as battery voltage, current, and controller ID. At 506, the controller returns from the interrupt after the data is broadcast. It should be appreciated that this process repeats during the next interrupt cycle.

Figure 6:
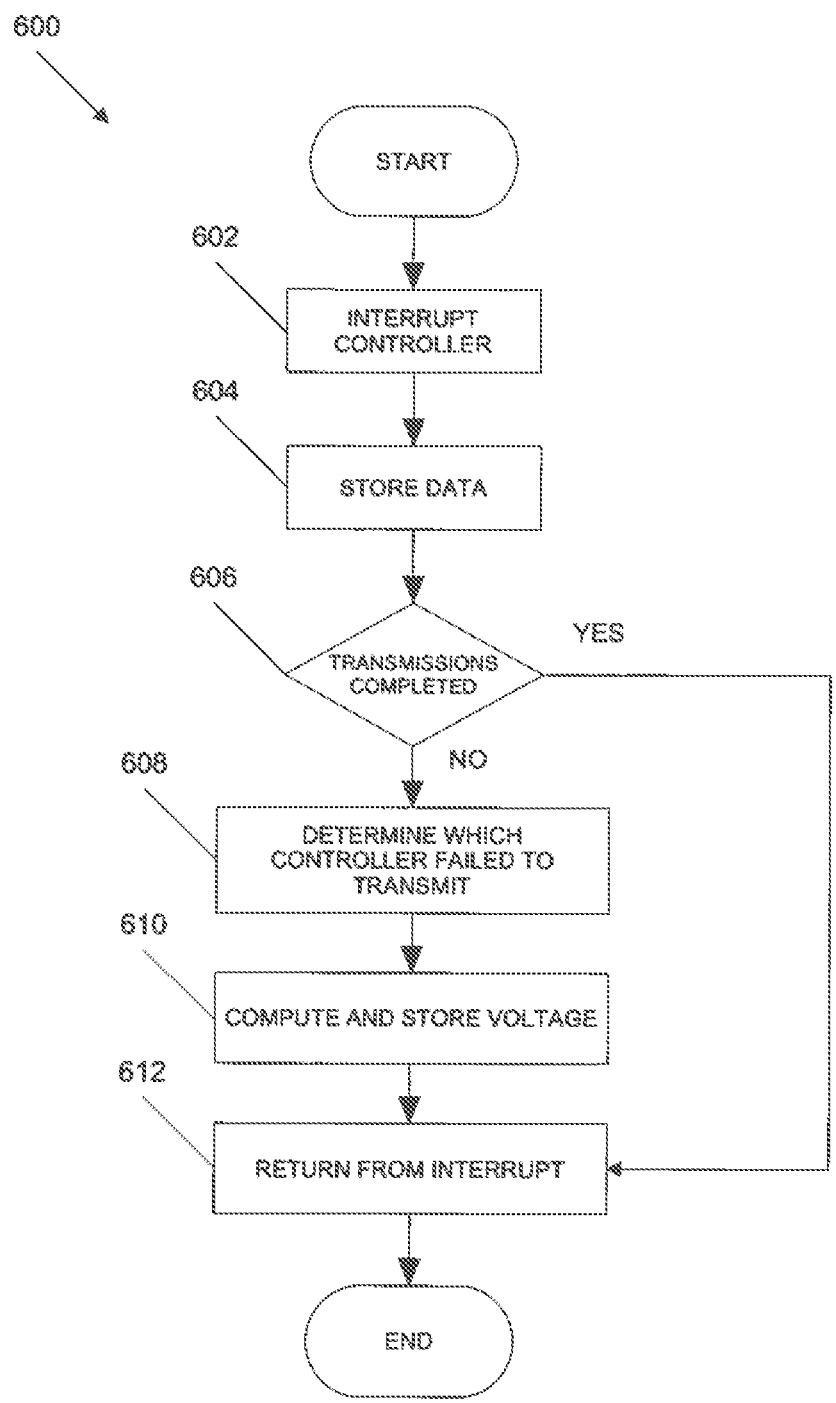
FIG. 6 illustrates a method for receiving cell data, in accordance with an embodiment of the present invention.

FIG. 6 illustrates a method 600 for receiving cell data, in accordance with an embodiment of the present invention. In this embodiment, at 602, a reception interrupts the controller when data is successfully received from another controller. At 604, the controller is configured to store the data. The data can include information regarding the cell voltage of another cell being monitored by another controller, the bypass current of the other cell, and other variables such as battery voltage, current, and the ID of the other controller.

At 606, after N receptions (where N is the number of cells in the battery), the controller receiving the data determines whether all of the controllers have broadcast data; in other words, all transmissions have completed. If all the controllers have broadcast data, then the controller receiving the data returns from interrupt at 612. If one of the controllers did not broadcast the data, then the controller receiving the data determines which controller did not broadcast data at 608. At 610, based on the controller that did not broadcast the data, the controller receiving the data computes and stores the data of the missing cell. In this embodiment, the data of the missing cell is determined by subtracting the sum of all cell voltages, which was received from the other controllers plus the cell voltage measured by the controller, from the total battery voltage, which was broadcasted by another controller or measured by the controller. At 612, the controller returns from interrupt.

Figure 7:
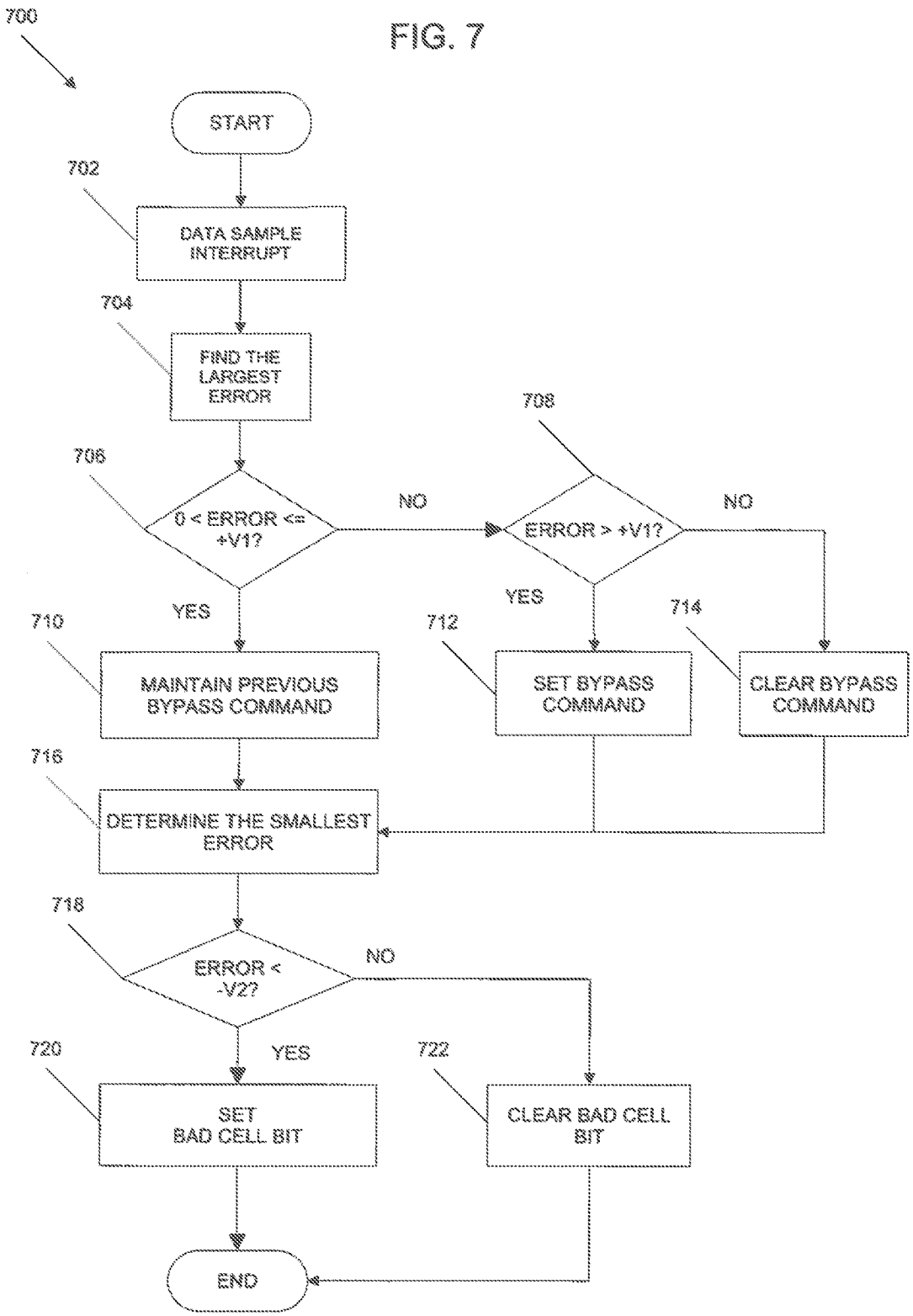
FIG. 7 illustrates a method of cell balancing, in accordance with an embodiment of the present invention.

FIG. 7 illustrates a method 700 of cell balancing, in accordance with an embodiment of the present invention. At 702, the controller is periodically interrupted to sample data. At 704, the controller computes the largest error. For instance, this may be the cell voltage of the controller's cell minus the cell voltage of each cell in the string of cells (i.e., $V_{cell} - V_{cell(i)}$).

Once the controller finds the largest error, the controller determines at 706 whether the error is between zero and a first voltage parameter V1. If the error is between zero and first voltage parameter V1, then the controller maintains the previous bypass command at 710. If the controller determines the error is not between zero and first voltage parameter V1, then the controller determines whether the error is greater than first voltage parameter V1 at 708. If the error is greater than first voltage parameter V1, then the controller sets a bypass command (or activates the bypass switch) at 712 in order to bypass a fraction of the current from the cell. If the error is not greater than first voltage parameter V1, then the controller clears the bypass command at 714.

At 716, the controller determines the smallest error. In this embodiment, the smallest error is computed by subtracting the cell voltage of the corresponding (or assigned) cell from the cell voltage for each cell (i.e., $V_{cell} - V_{cell(i)}$). Once the smallest error is found, the controller determines at 718 whether the error is less than second voltage parameter −V2. If the error is less than second voltage parameter −V2, then the controller sets a bad cell bit at 720. If the error is not less than second voltage parameter −V2, then the controller clears the bad cell bit at 722. The setting or clearing of the cell bit is to notify the operator as to the status of the cell.

The method steps performed in FIG. 5 to FIG. 7 may be performed by a computer program, encoding instructions for the nonlinear adaptive processor to perform at least the method described in FIG. 5 to FIG. 7, in accordance with an embodiment of the present invention. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIG. 5 to FIG. 7, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an application specific integrated circuit ("ASIC"), or a controller.

It should be appreciated that the embodiments described herein pertain to an apparatus and method that provides a distributed approach to charge control and the use of a robust communication bus to link the controllers. This approach improves the robustness of the battery by making it more fault-tolerant compared to a single battery controller approach. In addition to cell balancing, each controller can be programmable for over-voltage, under-voltage, over-temperature, and under-temperature monitoring and power management. Any number of controllers can be programmable for over-current monitoring and state-of-charge estimation.

The apparatus and method described herein can also be applied to battery energy storage applications, such as electric/hybrid vehicles, motorized wheelchairs, utility companies, hospitals, industrial/commercial buildings, space and military applications, etc.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
a plurality of master-less controllers not controlled by a master controller, each controller operatively connected to a corresponding cell in a string of cells, each controller is operatively connected to a neighboring controller;
wherein each controller is configured to bypass a fraction of current around the corresponding cell and locally decides to bypass current when the corresponding cell has a higher voltage than one or more other cells in the string of cells; and
wherein the neighboring controller is configured to manage a cell of another controller connected to the neighboring controller through a direct physical connection to that cell when the other controller fails to broadcast data.

2. The apparatus of claim 1, wherein each controller is configured to broadcast data to one or more other controllers via a communication bus.

3. The apparatus of claim 2, wherein the data comprises information regarding a cell voltage of the corresponding cell, a bypass current, a battery voltage, battery current, and an identification of a controller broadcasting the data.

4. The apparatus of claim 3, wherein each controller is configured to receive data from one or more other controllers via a communication bus.

5. The apparatus of claim 1, further comprising:
a relay driver configured to measure a battery voltage and a current supplied from a battery to a load or from a power source to the battery, and disconnect the power source or load from the string of cells when the current or voltage exceeds a threshold level,
wherein the relay driver is further configured to broadcast the battery voltage and current to at least one controller in order to perform cell balancing and state of charge estimation, and receive a periodic message from each controller in order to verify that each controller is operable.

6. An apparatus, comprising:
a string of cells;
a plurality of master-less controllers not controlled by a master controller, each controller connected to an assigned cell in the string of cells and connected to one neighboring controller;
wherein each controller is configured to bypass a fraction of current around the assigned cell and locally decides to bypass current when the assigned cell has a higher voltage compared to other cells in the string of cells; and
wherein the controller is further configured to maintain or bypass a current of a neighboring cell through a direct physical connection to that cell when the neighboring controller fails to broadcast data to the controller.

7. The apparatus of claim 6, wherein each controller receives power from a power source or the assigned cell.

8. The apparatus of claim 6, wherein each controller is configured to broadcast data to one or more controllers periodically, and further configured to receive data from the one or more other controllers.

9. The apparatus of claim 6, wherein the data comprises information regarding a cell voltage of the assigned cell, a bypass current of the assigned cell, a battery voltage, battery current, and an identification of the controller broadcasting the data.

10. The apparatus of claim 8, wherein each controller is configured to determine whether all other controllers broadcasted data after N broadcasts, where N is the number of controllers.

11. The apparatus of claim 10, wherein, when one controller fails to broadcast data, then each controller is further configured to compute and store a voltage of a cell assigned to the one controller that failed to broadcast the data.

12. The apparatus of claim 6, wherein each controller is configured to determine whether to bypass the current of the assigned cell and neighbor cell whose controller has failed based on a largest error,
wherein when the largest error is greater than zero and less than or equal to a voltage parameter, then a controller of the assigned cell is configured to maintain a previous bypass command on the current of the assigned cell,
when the largest error is greater than the voltage parameter, then the controller is configured to bypass the current of the assigned cell, and
when the largest error is less than or equal to 0, the controller is configured to stop bypass of the current of the assigned cell.

13. A computer-implemented method, comprising:
assigning a master-less controller to a cell in a string of cells wherein the master-less controller is not controlled by a master controller; and
wherein the master-less controller decides locally to bypass a fraction of current around the assigned cell when the assigned cell has a higher voltage compared to other cells in the string of cells; and
wherein the master-less controller maintains or bypasses a current of a neighboring cell through a direct physical connection with that cell when a neighboring controller fails to broadcast data to the assigned controller.

14. The computer-implemented method of claim 13, further comprising:
periodically broadcasting, from the assigned controller, data to one or more other controllers,
wherein the data comprises information regarding cell voltage of the assigned cell, a bypass current of the assigned cell, a battery voltage, a battery current, and an identification of the assigned controller.

15. The computer-implemented method of claim 13, further comprising:
interrupting the assigned controller to receive data when the data is received from one or more other controllers.

16. The computer-implemented method of claim 13, wherein the bypassing of the current further comprises:

maintaining the previous bypass command of the current on the assigned cell when a largest error is greater than zero and less than or equal to a voltage parameter,
bypassing the current on the assigned cell when the largest error is greater than the voltage parameter, and
stopping bypass of the current on the assigned cell when the largest error is less than or equal to 0.

* * * * *